United States Patent
Gauthier et al.

(10) Patent No.: US 8,021,464 B2
(45) Date of Patent: Sep. 20, 2011

(54) METHOD AND INSTALLATION FOR COMBINED PRODUCTION OF HYDROGEN AND CARBON DIOXIDE

(75) Inventors: Pierre-Robert Gauthier, Fresnes (FR); Bernd Polster, Franfurt am Main (DE); Pascal Marty, Bry sur Marne (FR)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 486 days.

(21) Appl. No.: 11/719,248

(22) PCT Filed: Oct. 27, 2005

(86) PCT No.: PCT/FR2005/050907
§ 371 (c)(1),
(2), (4) Date: Dec. 22, 2008

(87) PCT Pub. No.: WO2006/054008
PCT Pub. Date: May 26, 2006

(65) Prior Publication Data
US 2009/0298957 A1    Dec. 3, 2009

(30) Foreign Application Priority Data

Nov. 16, 2004 (FR) ...................... 04 52645

(51) Int. Cl.
*B01D 53/02* (2006.01)
(52) U.S. Cl. .................... 95/96; 95/99; 96/136
(58) Field of Classification Search ............. 95/96, 99
See application file for complete search history.

(56) References Cited

U.S. PATENT DOCUMENTS

| | | | |
|---|---|---|---|
| 6,301,927 B1 * | 10/2001 | Reddy ........................ | 62/619 |
| 6,398,853 B1 * | 6/2002 | Keefer et al. .................. | 96/125 |
| 2003/0191196 A1 | 10/2003 | Madhubhai et al. | |
| 2008/0308769 A1 * | 12/2008 | Marty et al. .................. | 252/373 |

FOREIGN PATENT DOCUMENTS

WO   WO 99 35455   7/1999

OTHER PUBLICATIONS

International Search Report for PCT/FR2005/050907.

* cited by examiner

*Primary Examiner* — Robert J Hill, Jr.
*Assistant Examiner* — Christopher P Jones
(74) *Attorney, Agent, or Firm* — Elwood L. Haynes

(57) ABSTRACT

The invention concerns a method for combined production of hydrogen and carbon dioxide from a mixture of hydrocarbons wherein the residual PSA is treated to produce a carbon dioxide-enriched fluid, and wherein: the residual PSA is compressed to a pressure such that the partial pressure of the $CO_2$ contained ranges between about 15 and 40 bar; the residue is subjected to one or more condensation/separation steps with production of $CO_2$-rich condensate(s) and a purge of noncondensable gas; the purge of noncondensable gas is preferably treated to produce a $H_2$-rich permeate which is recycled to the PSA, and a residue which is recycled to syngas generation, Preferably, the condensate(s) are purified by cryogenic distillation to produce food grade $CO_2$. The invention also concerns an installation for implementing the method.

21 Claims, 3 Drawing Sheets

METHOD AND INSTALLATION FOR COMBINED PRODUCTION OF HYDROGEN AND CARBON DIOXIDE

BACKGROUND

Figure 1:
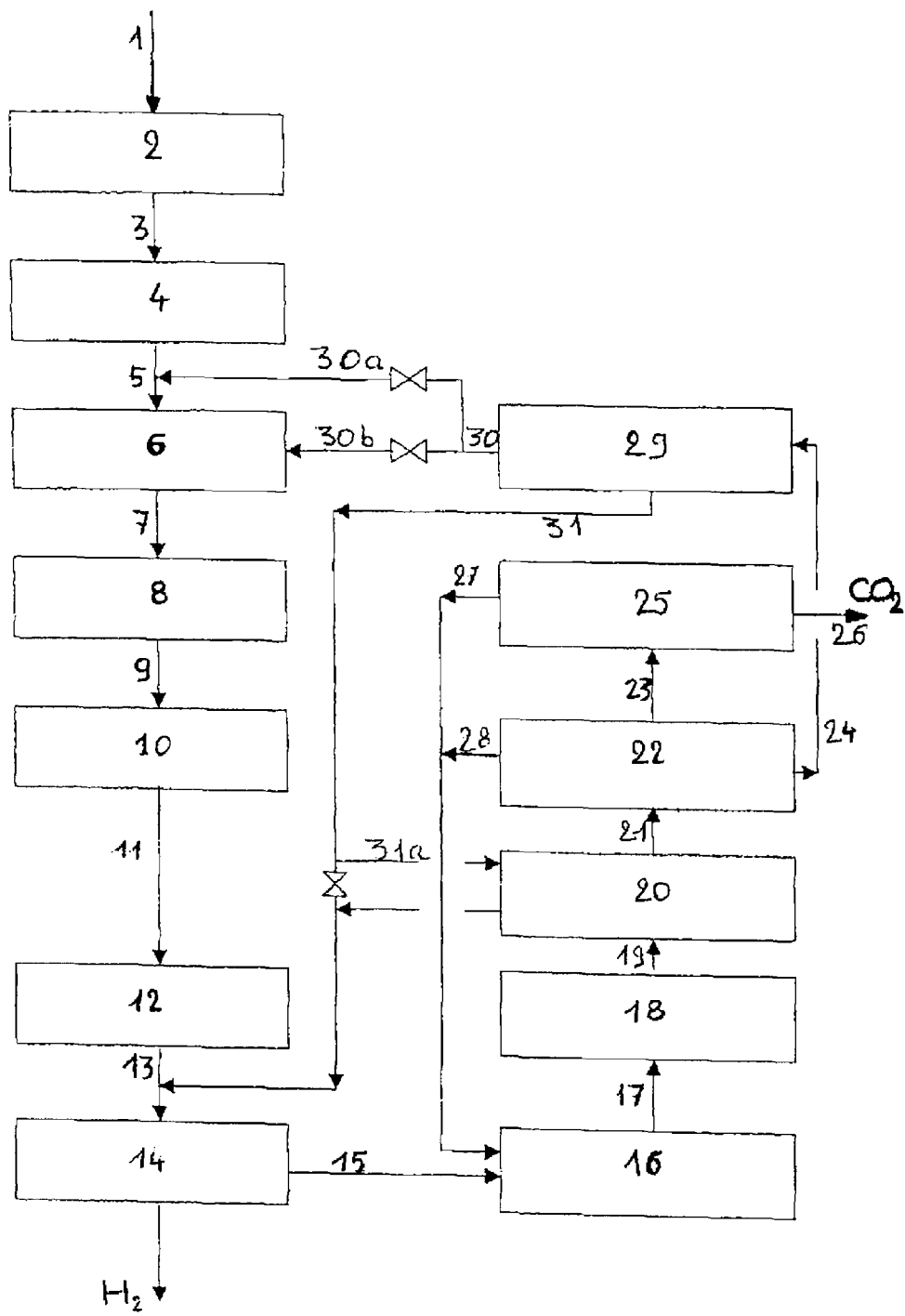

This application is a §371 of International PCT Application PCT/FR2005/050907, filed Oct. 27, 2005.

The present invention relates to a method for the combined production of hydrogen and carbon dioxide from a hydrocarbon source. More particularly, the present invention relates to a method for the combined production of hydrogen and carbon dioxide from a syngas obtained from hydrocarbons and particularly from natural gas, propane, butane, naphtha, liquefied petroleum gas, alone or mixtures thereof.

At the present time, carbon dioxide (or $CO_2$) used for food purposes, generally issues from rich sources, particularly natural $CO_2$ extracted by drilling in deep geological layers or $CO_2$ coproduced in hydrogen production units by steam reforming of hydrocarbons.

A very commonly used source is the $CO_2$-rich effluent (about 98% by volume on dry basis), available at low pressure, issuing from the decarbonation unit and incorporated in the preparation of the $N_2+3H_2$ feed for ammonia synthesis units.

This impure, water-saturated $CO_2$ is then compressed to about 35 bar, then purified by catalytic destruction and/or adsorption of the components heavier than $CO_2$, before being partially condensed cryogenically method and purified by distillation of the components lighter than $CO_2$, to be stored in liquid form, and finally transported in liquid or gas form.

Typically, the decarbonation unit uses scrubbing processes, under a pressure of between 15 to 40 bar, at ambient or lower temperature, and with a solvent (such as aqueous solution of amines, potassium carbonate, methanol, etc.) regenerable at low pressure and higher temperature.

However, the delocalization of ammonia plants to the developing countries or areas where hydrocarbon sources are cheap is leading to the disappearance of these conventional $CO_2$ sources in certain strong-demand countries of Europe and America.

Simultaneously, in the latter countries, the refining industry has a growing need for hydrogen ($H_2$) for the desulfurization of motor fuels. This leads to the construction of large hydrogen plants, generated by steam hydrocarbon reforming and purified particularly by adsorption with the regenerative pressure swing absorption (or PSA) method.

The hydrogen recovery yield of PSA purification units is close to 90%, the PSA offgas (or PSA purge gas) is typically available at a pressure below 2 bar, and contains the residual 10% of hydrogen and all the impurities contained in the syngas ($CH_4$, CO, $CO_2$, $N_2$, depending on the composition of the initial hydrocarbon feed). For its utilization, this offgas is accordingly sent as fuel to the burners of the steam reforming furnace.

For the satisfactory control of said burners, it is, however, necessary to import a certain quantity of fuel typically corresponding to 10 to 15% of the total fuel requirement.

Simultaneously, the improvements made to the steam reforming process have diminished the fuel requirement of the burners while at the same time increasing the heating value of the PSA offgas. Mention can be made in particular of the decrease of the steam/carbon or S/C ratio, which has both decreased the fuel requirement of the process and increased the quantity of $CH_4$ and CO produced and therefore the heating value of the PSA offgas. The need to utilize this PSA offgas at low pressure thus becomes a limiting factor for the optimization of steam reforming.

While steam reforming is the technique most commonly used for hydrogen production, use has also been made of other techniques for generating syngas, including autothermal reforming, catalytic or noncatalytic partial oxidation, the latter particularly being used in connection with waste oxidation.

Thus the following are simultaneously observed:
in user countries, a shortage of carbon dioxide sources meeting the demand of the industry. This $CO_2$ must be available in a form suitable for its intended use, particularly purified food grade $CO_2$;
a limitation of the yield of the hydrogen purification units, contingent on the PSA yield, which also gives rise to a limitation of the optimization of syngas generation, particularly from reforming.

A person skilled in the art knows how to jointly produce purified hydrogen by PSA and a concentrated stream of carbon dioxide from the decarbonation unit (by amine scrubbing, for example). The concentrated $CO_2$ stream is then compressed for purification. The PSA offgas is utilized either as fuel without compression, or by recycling to the upstream process, with compression. The implementation of this solution requires the use of two compressors, one to produce the $CO_2$, and the second to compress the offgas before recycling it to reforming. The cost of these compressors, of the decarbonation and of the PSA unit, makes this solution economically unacceptable.

A need therefore exists for an economically viable method for producing hydrogen, purified by PSA, and for producing carbon dioxide, while ensuring the utilization of the combustible gases included in the offgas issuing from the PSA.

The inventive solution consists in using a single compressor both for compressing the $CO_2$ to be purified and for compressing the other components of the offgas to be recycled. This economic solution for utilizing the PSA offgas is integrated in the method and also has the following advantages in its various alternatives:
$CO_2$ production, particularly food grade, but optionally being $CO_2$ of lower purity, to be used or stored locally or to be transported for distant storage or use;
production of a purge gas, which supplies reforming fuel, but can also be partially utilized as:
feed gas for reforming, and/or
PSA feed gas.

This is why the subject of the invention is a method for the combined production of hydrogen and carbon dioxide from a mixture of hydrocarbons, comprising at least:
a step (a) of generating a syngas containing at least carbon dioxide, hydrogen, carbon monoxide, methane and water vapor, from said hydrocarbon mixture;
a step (b) of cooling the syngas issuing from (a) with recovery of the available waste heat;
a step (c) of back-converting, to stream, all or part of the cooled syngas issuing from (b) in order to oxidize most of the carbon monoxide it contains to carbon dioxide, with the corresponding production of hydrogen;
a step (d) of cooling the mixture issuing from step (c), with condensation of the steam, by heat exchange with various boiler feedwater and/or deionized water circuits;
a step (e) of purifying the cooled mixture issuing from (d) in a pressure swing adsorption (PSA) unit to obtain a hydrogen-enriched stream having a purity at least equal to 98% and an offgas called "PSA offgas" containing carbon dioxide, at a pressure of about 1 to 3 bar abs;

and steps of treating said PSA offgas to obtain a carbon dioxide-enriched fluid, comprising at least:

a step (f) of compressing the PSA offgas to a pressure higher than the reforming pressure and such that the partial pressure of the $CO_2$ therein is between about 15 and 40 bar;

a step (g) of drying the compressed PSA offgas by removing the water therein to obtain a dry gas;

one or more successive steps (hn) of condensation/separation, such that each of the steps (hn) itself comprises:

a step of condensing all or part of the $CO_2$ present in the gas issuing from the preceding step, followed by a step of separating the $CO_2$-rich condensate issuing from the separation from the gas phase containing the incondensable compounds, and, the step(s) (hn) are implemented at temperatures tn of between ambient temperature and −56° C., with, for any n tn lower than tn-1, the gas phase issuing from step (hn-1) feeds the step (hn), the gas phase issuing from the final step (hn) constituting the incondensables purge, a step of using the incondensables purge.

Without the decarbonation step, but with the reverse conversion step, the PSA offgas contains a quantity of $CO_2$ of about 45% issuing from the reforming and reverse conversion (the exact $CO_2$ content naturally depending on the composition of the initial hydrocarbon mixture). Starting with PSA offgas, whereof the pressure is typically lower than 2 bar, the method offers the possibility, thanks to the compression in step (f), of having a gas at a total pressure of between 40 and 80 bar, corresponding to a $CO_2$ partial pressure of between 15 and 40 bar, compatible with cryogenic purification. These pressures make the fluids usable in the rest of the method without being forced to resort to additional compressions.

Depending on the average $CO_2$ content of the gas supplying the first condensation/separation unit, the condensation/separation can be carried out at a temperature of between −10° C. and ambient temperature. Since the gas phase produced by the separation is poor in $CO_2$, the next separation requires a lower temperature; thus the successive separations are carried out at decreasing temperatures, extending from a temperature of about −56° C., that is close to the triple point of $CO_2$. The method can implement one to five successive steps (hn) of condensation/separation; preferably, it uses two or three successive steps (hn).

Before being recycled to the method, or exported to another method, the incondensables purge may be subjected to supplementary treatments. This purge, obtained upon completion of the steps (hn), is in the form of a gas essentially containing hydrogen, methane, carbon monoxide, a carbon dioxide fraction issuing from the PSA offgas, not recovered in the condensates, and nitrogen. These incondensables can be utilized as fuel for the reforming furnace or during a preheat, but also, see above, as feed gas to generate the syngas, and/or PSA feed gas, in the inventive method or in an external method. For this purpose, they may undergo a supplementary treatment according to various advantageous embodiments of the invention described below.

Each condensate which is rich in $CO_2$, can, thanks to appropriate supplementary treatments, be used or sequestered on site or nearby in gas form; it may be exported for use or sequestration in gas or liquid form. It may in particular and very highly advantageously be used in the food industry, thanks to appropriate purification.

Preferably, step (a) is a step of catalytic or noncatalytic partial oxidation or a steam or autothermal reforming step.

If the $CO_2$ produced is not used on site or nearby, and according to a first particular embodiment, all or part of the condensates issuing from the steps (hn) are vaporized after expansion, with recovering refrigeration, in order to produce $CO_2$ gas under a pressure of between 5 and 40 bar. The refrigeration recovered is advantageously used for cooling process fluids in addition to the refrigerating units. The $CO_2$ can then be compressed to be transported by gas pipeline to a use and/or sequestration site.

According to another embodiment, but also if the $CO_2$ produced is not used on site or nearby, all or part of the condensates issuing from the steps (hn) are produced in liquid form to be transported in this form to a use and/or sequestration site.

When a person skilled in the art does not need to produce pure carbon dioxide, he thus provides for removing the water contained, and then recovers a more or less large part of the $CO_2$ by successive separations, and also the heavy $C^{2+}$ impurities (that is the organic molecules containing two or more carbon atoms) and part of the methane present in the PSA offgas.

However, the method is particularly advantageous when used to optimize hydrogen production and to jointly produce food grade carbon dioxide.

It then comprises, in addition to the steps described above, at least:

a step of removing heavy impurities prior to the first step (hn) and also:

for at least part of the steps (hn), a step (i) of removing the light impurities present in the corresponding condensates to obtain food grade $CO_2$, this step comprising at least:

a step (i1) of expanding the condensate to a pressure of about 5 to 40 bar, preferably of 10 to 30 bar, and a step (i2) of distilling the expanded condensate to obtain a liquid phase consisting of purified food grade $CO_2$, and a gas phase containing said light impurities.

In the context of the present invention, heavy impurities means hydrocarbons and other impurities having a vapor pressure lower than that of $CO_2$. The removal of heavy impurities is conventionally carried out by passing the fluid to be purified on a bed of adsorbents and/or on a bed of catalysts.

During this step of removing the light impurities (i), obtained by cryogenic purification, the condensate is stripped of the light impurities that it contains, and particularly the light impurities entrained in step (hn).

This alternative of the method is thereby suitable for jointly producing hydrogen and food grade carbon dioxide, with recovery of the light components of the PSA offgas in the incondensables purge.

Preferably, all or part of the gas phase issuing from step (i2) is reincorporated in the compression step (f).

Advantageously, said reincorporation is carried out via an ejector in order to further contribute to the compression of step (f). In fact, the principle of the ejector is to use the driving force of a high pressure gas to increase the pressure of a lower pressure gas. In the context of the present invention, the lower pressure gas is usually the PSA offgas, while the high pressure gas is the gas phase issuing from step (i2). It is, however, also conceivable that if the PSA offgas is at a higher pressure than that of the gas phase issuing from step (i2) (after having undergone a first compression, for example), in this case, it is the PSA offgas that provides the driving force of the system. Another process gas having a sufficient pressure can also be used.

With or without the contribution of the ejector, part of the compression can be provided by any type of compressor: screw, piston or preferably centrifugal.

Preferably, the last of the steps (hn) comprises at least the following intermediate steps:

a step of condensing, at a temperature lower than −40° C., all or part of the CO$_2$ present in the gas phase issuing from step (hn-1), a step of separating the CO$_2$-rich condensate obtained from the gas phase which contains the incondensable compounds and constitutes the incondensables purge, a step of heating the incondensables purge and the liquid condensate expanded to a pressure of between 5 and 35 bar countercurrently with the condensation, and of recovering refrigeration in order to cool the process fluids, a step of reincorporating the vaporized CO$_2$-rich phase in the compression step (f).

A further major advantage of the invention resides in the optimized utilization of the incondensables purge.

The incondensables purge can be used, in full or in part, without supplementary treatment, outside the method, particularly as fuel, or feed in a method outside that of the invention.

The incondensables purge can also be expanded, in full or in part, in the method to produce refrigeration prior to a use at low pressure outside or within the method.

All or part of the incondensables purge may be reincorporated, without supplementary treatment in the method.

It is advantageously reincorporated in the syngas generation step to be used as fuel.

When the pressure of the incondensables purge is sufficient, that is, when it is higher than that of step (a), it can be reincorporated, in full or in part, without supplementary treatment, in the syngas generation step, to be used as fuel and/or as feed gas; the hydrogen present then passes through the reformer without conversion.

This purge can also be used to supplement the PSA feed gas.

In general, however, the incondensables purge preferably undergoes supplementary treatment steps designed to optimize its use. In particular, the incondensables purge is treated in a permeation unit to produce a purge waste rich in methane and carbon monoxide, available at a pressure higher than the pressure of step (a), and a permeate enriched with hydrogen and optionally with carbon dioxide, at a pressure higher than the operating pressure of the PSA unit of step (e).

According to a particular embodiment, all or part of said permeate is recycled to the inlet of the PSA purification unit of step (e). It may also be sent, in full or in part, to a PSA unit external to the method, particularly if the pressure of the permeate is lower than that of the PSA unit of step (e).

Advantageously, said permeate recycled to the PSA purification unit is separated into two fractions, one of which is used for the regeneration of the dryers in step (g), the fractions are then combined, and the entire recycled permeate is sent to the inlet of the PSA purification unit of step (e).

Recycling the permeate to the inlet of the PSA unit serves to improve the overall hydrogen recovery yield. Thus, this H$_2$ recovery yield, which is a maximum of about 90% in the case of the operation of a conventional PSA unit, may, in the context of the invention, rise to 95% or more. Furthermore, recycling this hydrogen-rich fraction recovered from the offgas from the PSA unit, to the inlet thereof, commensurately decreases the quantity of offgas to be recycled elsewhere in the method or to be removed.

Preferably, the purge waste is recycled to step (a), as partial substitution for the hydrocarbon mixture, and/or is used as fuel, either in the combustion chamber of a nonadiabatic reformer, or in a feed preheating furnace in the case of an autothermal reformer or a partial oxidation.

Essentially containing methane and carbon monoxide, the purge waste used as partial substitution for the hydrocarbon mixture of step (a) is partially substituted for the reagent (methane), and partially for the product (syngas), thereby improving the yield of the reforming reaction:

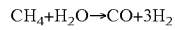

$$CH_4+H_2O \rightarrow CO+3H_2$$

Furthermore, in the case of nonadiabatic reforming, this partial waste recycling as reforming feed serves to reduce the quantity of waste to be sent to the burners of the combustion chamber.

The method may further comprise a step of prereforming the hydrocarbon mixture, prior to the reforming step (a). It may also comprise, prior to the reforming—or the prereforming step—a step of desulfurization of the hydrocarbon mixture to be reformed or prereformed.

According to a particularly advantageous alternative, the method provides for stabilizing the composition of the PSA offgas upstream of the treatment steps thereof, so that it has a CO$_2$ content that is stable over time, particularly less dependent on the well-known variations in composition associated with the normal operation of a PSA unit.

Thus, in order to stabilize the composition of the PSA offgas to a high value—corresponding for example to the maximum CO$_2$ content of said PSA offgas—the method advantageously comprises a step of incorporating, in the compression step (f), a gas phase richer in CO$_2$ than the PSA offgas, issuing from a buffer tank supplied in full or in part with the condensed—and then vaporized—phase issuing from the separation of the last of the steps (hn), and/or with the gas phase issuing from step (i2), and/or with CO$_2$ gas issuing from the unavoidable evaporation of a liquid CO$_2$ storage unit (or any other source appropriate for this use and available on the site). These various gas phases are available at pressures of about 5 bar or more.

Similarly, the CO$_2$ content can be stabilized at a low value, corresponding for example to the minimum CO$_2$ content of the PSA offgas. The method then advantageously comprises a step of incorporating, in the compression step, a gas phase poorer in CO$_2$ than the PSA offgas, issuing from a buffer tank supplied in particular with the permeate sent to the PSA unit. Said permeate is in the form of a gas under a pressure of about 15 to 35 bar, preferably at about 25 bar.

In order to stabilize the composition of the PSA offgas at a medium value, the method may comprise a step of incorporating in step (f), and as required, either a CO$_2$-rich gas phase issuing from a buffer tank supplied with said CO$_2$-rich gas phase as described above, or a CO$_2$-poor gas phase issuing from a buffer tank supplied with said CO$_2$-poor phase as described above.

These buffer tanks, supplied with gaseous fluids at pressures higher than the inlet pressure of the PSA offgas in the compression step (f) serve to stabilize the composition of the feed in said step by appropriate reinjections at one of the intermediate stages of the feed compressor.

According to one alternative of the invention, it relates to a method for the combined production of hydrogen and carbon dioxide from a mixture of hydrocarbons, comprising at least:
a step (a) of generating a syngas containing at least carbon dioxide, hydrogen, carbon monoxide, methane and water vapor, from said hydrocarbon mixture;
a step (b) of cooling the syngas issuing from (a) with recovery of the available waste heat;
a step (c) of back-converting to steam all or part of the cooled syngas issuing from (b) to oxidize most of the carbon monoxide it contains to carbon dioxide, with the corresponding production of hydrogen;

a step (d) of cooling the mixture issuing from step (c), with condensation of the steam, by heat exchange with various boiler feedwater and/or deionized water circuits;

a step (g') of drying the cooled mixture issuing from (d) by removing the water therein to obtain a dry gas mixture;

a step (e') of purifying the dry mixture issuing from (g') in a pressure swing adsorption (PSA) unit to obtain a hydrogen-enriched stream having a purity at least equal to 98% and an offgas called "dry PSA offgas" containing carbon dioxide, at a pressure of about 1 to 3 bar abs;

and steps of treating said dry PSA offgas to obtain a carbon dioxide-enriched fluid, comprising at least:

a step (f') of compressing the dry PSA offgas to a pressure higher than the reforming pressure and such that the partial pressure of the $CO_2$ therein is between about 15 and 40 bar;

one or more successive steps (hn) of condensation/separation, such that each of the steps (hn) itself comprises:
a step of condensating all or part of the $CO_2$ present in the gas issuing from the preceding step, followed by
a step of separating the $CO_2$-rich condensate issuing from the separation from the gas phase containing the incondensable compounds,
and,
the step(s) (hn) are implemented at temperatures tn of between ambient temperature and −56° C., with, for any n tn lower than tn-1,
the gas phase issuing from step (hn-1) feeds the step (hn), the gas phase issuing from the final step (hn) constituting the incondensables purge, a step of using the incondensables purge.

The gas drying step (g') may also be located at an intermediate stage of the compression steps of step (f').

It is clear that the preferable embodiments described previously in the case in which the water is removed from the PSA offgas, after the compression step, apply similarly, or in an obvious manner to a person skilled in the art, to these alternatives of the method. The description of these preferential embodiments is therefore not resumed here to avoid encumbering the description. These preferential embodiments, applied to this second alternative, must nevertheless be considered as forming an integral part of the invention.

According to a second aspect of the invention, it relates to an installation for the combined production of hydrogen and carbon dioxide from a mixture of hydrocarbons, comprising at least:

a module for generating a syngas containing at least carbon dioxide, hydrogen, carbon monoxide, methane and water vapor, from a hydrocarbon mixture;

a first module for cooling the syngas with means for recovering the available waste heat;

a module for back-converting to steam all or part of the syngas;

a second module for cooling the mixture after conversion, with condensation of the steam, by heat exchange with various boiler feedwater and/or deionized water circuits;

a pressure swing adsorption (PSA) unit for purifying the cooled mixture issuing from the second cooling module for the production of purified hydrogen to a purity at least equal to 98% and an offgas called "PSA offgas" containing carbon dioxide;

a module for compression suitable for compressing the PSA offgas to a pressure higher than the reforming pressure and such that the partial pressure of the $CO_2$ present is between about 15 and 40 bar;

a module for drying the compressed PSA offgas by removing the water present to obtain a dry gas;

means for implementing the successive steps (hn) of condensation/separation as claimed in claim 1, comprising for each of the steps (hn) with the exception of the last:
a condensation/separation module supplied with gas issuing from the preceding step, equipped with means for recovering the $CO_2$-rich condensate and for recovering the gas phase containing the incondensable compounds,
means for transporting the gas phase issuing from step (hn-1) to the feed of the condensation/separation module of the next step,
and, for the final condensation/separation step:
a condensation/separation module supplied with gas issuing from the preceding step, equipped with means for recovering the $CO_2$-rich condensate and for recovering the gas phase containing the incondensable compounds,
means for recycling the gas phase issuing from the condensation/separation module of the final step to the method, or for sending it to the exterior.

In particular, the installation being designed to produce food grade carbon dioxide, it further comprises at least:
a module for removing the heavy impurities upstream of the first condensation module and also:
for at least part of the steps (hn):
condensate expansion means, and
means for distilling the expanded condensate to obtain a liquid phase consisting of purified food grade $CO_2$ at the bottom of the distillation column, and a gas phase containing the light impurities at the top of the column.

According to a particular embodiment, the installation comprises for the implementation of the final step (hn):
means for condensing, at a temperature below −40° C., all or part of the $CO_2$ contained in the gas phase issuing from the step (hn-1),
means for separating the $CO_2$-rich condensate obtained from the gas phase which contains the incondensable compounds and constitutes the incondensables purge,
a heat exchanger for transferring heat between the incondensables purge and the liquid condensate expanded to a pressure of between 5 and 35 bar by passage countercurrently to the condensation, and for recovering refrigeration by heat exchange with the expanded condensate and the incondensables purge,
means for recycling the vaporized $CO_2$-rich phase to the compressor.

According to a preferred embodiment, it comprises for the treatment of the incondensables purge, at least:
a permeation unit supplied with the incondensables purge for producing a purge waste rich in methane and carbon monoxide and a hydrogen-enriched permeate,
means for recycling at least part of the permeate to the inlet of the PSA unit,
means for recycling the purge waste to the syngas generation module as partial substitution for the hydrocarbon mixture supplying it, and/or as fuel.

The invention will now be described with reference to the drawings and examples below.

The drawings illustrate particular embodiments of the inventive method.

It must be understood that the invention is not limited to these embodiments. A person skilled in the art can in particular consider:

the combination of treatment and recycling techniques illustrated in these embodiments, other syngas production techniques, like those mentioned previously, other uses of the purge such as those mentioned above.

Figure 2:
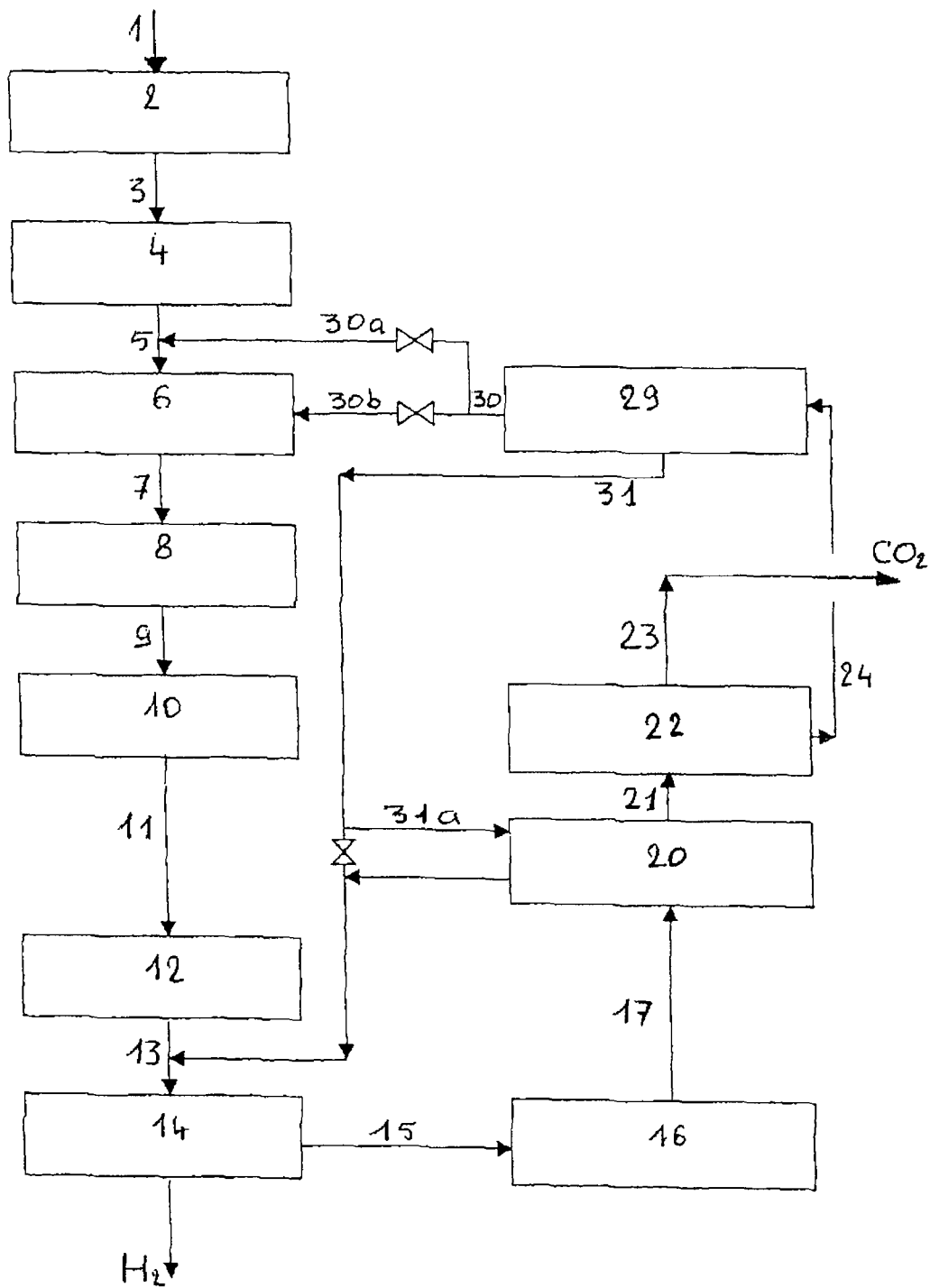

FIGS. 1 and 2 show functional diagrams illustrating preferred embodiments of the invention for the production of hydrogen and, respectively, food grade carbon dioxide or carbon dioxide to be sequestered.

Figure 3:
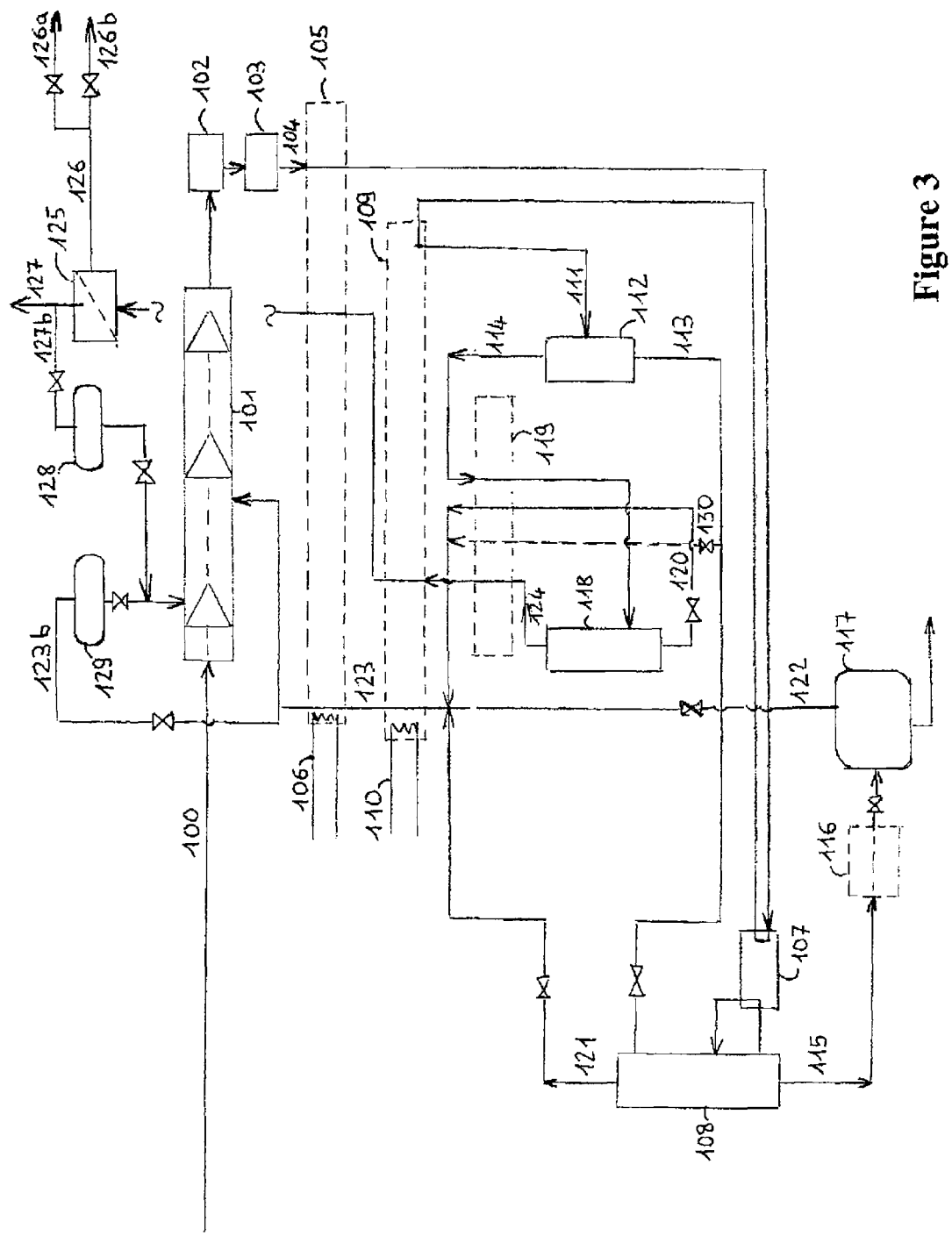

FIG. 3 schematically shows an installation according to the invention for the liquefaction and purification of the $CO_2$ present in the PSA offgas from a hydrogen production installation in order to obtain food grade $CO_2$.

FIG. 1 describes the functional diagram of an installation for producing food grade carbon dioxide (and hydrogen) according to the invention. The part of the installation for producing hydrogen is not shown when distinct from the part of the installation leading to the production of $CO_2$.

The feed supplied to the method consists of a mixture of hydrocarbons—here natural gas (NG)—the hydrocarbon stream 1 supplies a desulfurization module 2.

The desulfurized feed 3 is then sent to a prereformer 4; the prereformed mixture 5, a mixture essentially consisting of methane, hydrogen, carbon monoxide, carbon dioxide and water, feeds the reforming module 6 which, via step (a) of the method, produces the syngas 7 essentially containing hydrogen, carbon monoxide, carbon dioxide, methane and water vapor.

The syngas is cooled by heat exchange, according to step (b) of the method, with boiler feedwater at 8, then the cooled gas 9 is treated according to step (c) of the method in a reverse-conversion module 10, where the CO is converted to $H_2$ and $CO_2$. The gas mixture 11 leaving the module 10 is cooled in the module 12, according to step (d) of the method, with condensation of the steam present in the mixture by heat exchange with various boiler feedwater and/or deionized water circuits.

The cooled mixture 13 is then treated in a hydrogen purification unit 14 of the PSA type, according to step (e) of the method, to obtain a hydrogen-enriched gas stream having a purity at least equal to 98% and an offgas 15—called the PSA offgas—containing the carbon dioxide. This PSA offgas 15 is available at a pressure of about 1 to 3 bar abs, and essentially contains all the $CO_2$ coproduced during the reforming and reverse-conversion steps. Typically, in the case of FIG. 1 where the hydrocarbon mixture 1 fed to the method is natural gas, the average composition of the PSA offgas is close to: $CO_2$: 45%-CO: 12%-$H_2$: 23%-$CH_4$: 17%-$H_2O$: 1%-$N_2$: 2%. Taking account of the variations of composition associated with the cycle of the PSA unit, the $CO_2$ content is between 42 and 48%, the $H_2$ content varies between 20 and 26%, and the contents of the other components remain more or less constant.

The PSA offgas 15 is then compressed in the compression module 16, according to step (f) of the method, to obtain a compressed PSA offgas 17. It is compressed to about 60 bar, providing a $CO_2$ partial pressure of about 27 bar.

The compressed PSA offgas 17 is first stripped of its heavy impurities in a module 18, by a succession of regenerable adsorptions for example, producing a purified compressed offgas 19 which is then dried, according to step (g) of the invention, in a drying module 20 to obtain a compressed offgas 21, stripped of its heavy impurities and dried.

The offgas 21 is then cooled to be separated by liquefaction in a separation module 22, in order to obtain a condensate 23 essentially containing liquid $CO_2$ and a gas mixture 24 containing a fraction of uncondensed $CO_2$ and the lighter compounds called incondensables, according to the steps (hn) of the invention. This separation is carried out in two steps in the case of FIG. 1.

The offgas 21 is cooled by countercurrent flow of the cold fluids issuing from the cryogenic purification and by heat exchange with an associated external refrigeration unit. The condensate 23 essentially contains $CO_2$, but in order to obtain food grade $CO_2$, the condensate 23 is purified by distillation in order to strip it of the light impurities entrained in the liquid phase. For this purpose, the condensate 23 is expanded to 23 bar before being fed to the distillation column 25. A liquid phase 26 consisting of food grade $CO_2$ is recovered at the bottom of the column, and a gas phase 27 at the top of the column. This gas phase 27 containing a high proportion of $CO_2$ is recycled to the compression module 16.

As recalled above, the separation carried out in the module 22 takes place in two steps. The first separation is obtained for a temperature of about −28° C. (depending on the $CO_2$ partial pressure, itself depending on the total pressure and the proportion of $CO_2$ in the stream 21). The gas mixture issuing from the first separation is cooled in a heat exchanger (not shown) to a temperature of about −50° C., flowing countercurrently to the fluids issuing at this temperature from the second separation step. In this way, another condensate and the gas mixture 24 are separated at the outlet of the second (and final) separator. The condensate issuing from the second separator at a temperature of about −50° C. is vaporized in the heat exchanger to form a gas stream 28. It is then incorporated in the gas stream 27 to be recycled to the compression module 16.

The gas mixture 24 obtained from the separation contains the light impurities of the feed 1; heated to ambient temperature in the heat exchangers, it constitutes the incondensables purge, available under a pressure of 58 bar. The composition of the purge is approximately: $CO_2$: 21%-CO: 18%-$H_2$: 36%-$CH_4$: 24%-$N_2$: 1%.

The incondensables purge 24 is then treated in the permeation module 29 which produces a purge waste 30 enriched with methane and CO available at high pressure (about 56 bar), and a permeate 31 enriched with $H_2$ at a pressure of about 25 bar.

The hydrogen-rich permeate 31 is recycled to the inlet of the hydrogen purification unit 14. Part 31a of the permeate is previously diverted to the drying unit 20 for the regeneration of the dryers, and then reincorporated in the undiverted fraction to be recycled to the feed of the PSA unit 14.

The purge waste 30 is recycled to reforming so that its part 30a is thereby added to the prereformed mixture 5 supplying the reformer 6 and its part 30b is used as fuel in the reforming burners.

The recyclings of mixtures 30a and 31 serve to decrease the quantity of offgas 30b sent as fuel to reforming, and also to better utilize the components which make them up. Thus, the hydrogen-enriched permeate 31 is recycled to the inlet of the hydrogen purification unit 14, in order to increase, for a given initial feed 1, the production of hydrogen, and hence the total $H_2$ recovery yield of the installation. The mixture 30a provides a certain quantity of already reformed gas to the reforming feed 5.

FIG. 2 describes the functional diagram of an installation for producing carbon dioxide to be sequestered (and hydrogen) according to the invention. The part of the installation corresponding to hydrogen production is not shown insofar as it is distinct from the part of the installation corresponding to $CO_2$ production.

The installation shown only differs from that in FIG. 1 in the separation of the components of the PSA offgas.

The steps leading to the production of compressed PSA offgas 17 are identical to those in FIG. 1.

The compressed PSA offgas 17 is then dried, according to step (g) of the invention, in a drying module 20 to obtain a compressed and dried offgas 21. Due to the fact that the carbon dioxide is not to be used pure, it is therefore useless to purify it.

As in the case of obtaining food grade $CO_2$, the offgas 21 is then cooled to be separated by liquefaction in a separation module 22, in order to obtain a condensate 23 essentially containing liquid $CO_2$ and a gas mixture 24 containing a fraction of uncondensed $CO_2$ and also the lighter or incondensable compounds, according to step (h) of the invention.

The offgas 21 is cooled by countercurrent flow of the cold fluids and by heat exchange with an associated external refrigeration unit. The condensate 23 essentially contains $CO_2$, and there is no need to purify it.

The separation as shown in FIG. 2 is a single-step separation (as testified by the absence of fluid 28). The method is intended to produce $CO_2$ in the form of pressurized $CO_2$ gas, for transportation to a storage site by pipelines. Two alternatives (not shown) are now described for treating the condensate.

In the first alternative, the condensate 23 is expanded to a pressure of about 10 bar, then revaporized and superheated in heat exchange lines to ambient temperature. Thanks to the cold provided to the method by this vaporization, the unit can operate with a limited external refrigeration input, since the $CO_2$ gas is available under about 10 bar at battery limits.

In a second alternative, the condensate 23 is vaporized, and heated to ambient temperature under a pressure of about 58 bar. To maintain low temperatures, the unit requires the use of a large refrigeration unit, and the $CO_2$ gas is available under about 58 bar at battery limits.

An alternative of the method would be to produce liquid $CO_2$ also intended for sequestration. In this case, the $CO_2$ can be transported to the storage site by ship. This alternative is appropriate for offshore underground storage.

The treatment of the incondensables purge 24 is identical to that in the case of the production of food grade $CO_2$ described in FIG. 1.

FIG. 3 schematically shows the part of an installation for the combined production of hydrogen and food grade carbon dioxide which treats the PSA offgas to produce food grade liquid $CO_2$ by implementing an alternative of the inventive method as described above.

The upstream part of the installation (not shown) is supplied with natural gas, a PSA unit separates a hydrogen stream, having a purity above 98%, from the PSA offgas. This offgas contains all the $CO_2$ coproduced by steam reforming and reverse conversion.

The part of the installation shown in FIG. 3 is the one intended to produce food grade liquid $CO_2$. For this purpose, the PSA offgas 100 is compressed in a multistage feed compressor 101 to a pressure of about 60 bar. The gas thus compressed is separated from the condensed water in a separator 102, then dried and stripped of its heavy impurities by a succession of regenerable adsorptions at 103. The fluid 104 thus obtained is in the form of a gas under a pressure of about 59 bar, dry, stripped of these heavy impurities and at a temperature of about 30° C. It is then cooled in countercurrent flow to fluids issuing at this temperature from cryogenic purification in the heat exchanger 105 and by heat exchange with an associated external refrigeration cycle 106 to a temperature of about 0° C. It is then cooled by giving up heat during its partial liquefaction in the reboiler 107 of the $CO_2$ distillation column 108. It is then cooled in countercurrent flow to fluids issuing at this temperature from the cryogenic purification in the heat exchanger 109 and by heat exchange with an associated external refrigerating cycle 110 to a temperature of about −29° C. This produces a fluid 111 at −29° C. and about 58 bar. At this temperature, most of the $CO_2$ is liquefied. The fluid 111 is then sent to a first separator 112 where the condensate 113 is separated from the uncondensed phase 114. The condensate 113 is expanded via an expansion valve to a pressure of 23 bar to supply the distillation column 108.

The purified liquid $CO_2$ 115 is recovered at the bottom of the column 108 so that, after subcooling at 116 designed to limit its evaporation, it can be stored in a liquid $CO_2$ tank 117 and then conveyed to the client.

The uncondensed phase 114, issuing from the separator 112 at a temperature of about −29° C., is again cooled, to −51° C., in countercurrent flow to the fluids issuing at this temperature from the second separator 118, these heat exchanges contributing to the heat exchange line 119. The liquid phase from the separator 118 is rich in $CO_2$, is expanded and constitutes the fluid 120 at a pressure of 12 bar and a temperature of −55° C.; revaporized during its heating to −33° C. by passage through the heat exchange line 119, it is mixed with the gas phase 121 issuing from the top of the distillation column 108 at a pressure of about 23 bar and a temperature of about −30° C., and with the evaporation gas 122 (called "flash" gas) to constitute a gas stream 123. Heated to ambient temperature by successive passages through the heat exchange lines 109, and then 105, this $CO_2$-rich gas stream is then essentially recycled to the inlet of the liquefaction unit, more precisely at an intermediate stage of the feed compressor 101; a fraction 123b is withdrawn from the main stream to supply the buffer tank 129 with a $CO_2$-rich gas phase.

The gas phase 124 issuing from the separator 118 which contains the light impurities of the feed 100 is heated to ambient temperature in the heat exchange lines 119, 109, 105 and constitutes the incondensables purge, available under a pressure of about 57 bar.

The heat exchangers (heat exchange lines 119, 109 and 105) and the separators 112 and 118 and the connecting lines between them are preferably placed in a cold box in order to reduce the loss of refrigeration. All or part of the following units and their associated connecting lines can also be incorporated in this cold box:

refrigeration cycle(s) 106, 110;
reboiler 107;
distillation column 108;
subcooler 116;
tank 117.

The incondensables purge 124 is treated in the permeation unit 125 which delivers the purge offgas 126 intended to supply the reforming as feed, 126a and as fuel, 126b. The permeate 127 issuing from the permeation unit 125 is essentially recycled to the PSA inlet, a fraction 127b being withdrawn from the main stream to supply the buffer tank 108 with a $CO_2$-poor gas phase. The buffer tanks 128 and 129 deliver, as required, a stream more or less rich in $CO_2$, to the compressor 101 in order to stabilize the composition of the fluid treated. If necessary, part of the stream 113 can be withdrawn via 130 before expansion, expanded to the pressure of the stream 123, the cold thereby generated providing additional cold to the heat exchange line 119.

The table below shows the compositions, pressures and temperatures of the various fluids referenced in FIG. 3 for an exemplary embodiment of the invention according to FIG. 3.

TABLE

| Fluid references | Contents (% mol) | | | | | | Pressure (bar abs) | Temperature (° C.) |
|---|---|---|---|---|---|---|---|---|
| | $CO_2$ | $H_2$ | CO | $CH_4$ | $N_2$ | $H_2O$ | | |
| 100 | 44.87 | 23.35 | 12.00 | 17.56 | 1.60 | 0.61 | 1.3 | 35 |
| 104 | n.R | n.R | n.R | n.R | n.R | n.R | 59 | 32 |
| 111 | n.R | n.R | n.R | n.R | n.R | n.R | 58 | −29 |
| 113 (after expansion) | 92 | 1 | 2 | 5 | (—) | (—) | 23 | −37 |
| 114 (after cooling) | n.R | n.R | n.R | n.R | n.R | n.R | 58 | −48 |
| 115 | >99.99995 | (—) | (—) | (—) | (—) | (—) | 22.5 | −16 |
| 120 | 91 | 1 | 2 | 6 | (—) | (—) | 12 | −56 |
| 121 | 69 | 4 | 7 | 20 | (—) | (—) | 12 | −37 |
| 122 | 100 | (—) | (—) | (—) | (—) | (—) | n.R | n.R |
| 124 | 21 | 36 | 18 | 24 | 1 | (—) | 57 | −47 |
| 126b | 18 | 23 | 24 | 33 | 2 | (—) | 56 | 80 |
| 127 | 26 | 62 | 7 | 5 | (—) | (—) | 26 | 32 |

(—): close to zero
n.R: not reported

The advantages of the inventive method are thus in particular:

Increase in the recovery yield of hydrogen generated by the reforming or partial oxidation and the conversion. Thus, the total recovery yield of hydrogen which, with a PSA unit is conventionally a maximum of 90%, is raised to about 95%, or more, by the inventive method (in the context of the invention, hydrogen recovery yield means hydrogen produced/hydrogen generated).

Recovery of up to about 80% of the $CO_2$ coproduced in the $H_2$ production unit without having to invest in a scrubbing unit dedicated for this purpose with high steam consumption.

Recycling in the form of feed of all or part of the purge and reduction of the quantity of combustible gas to be sent to the syngas generation step, thereby serving to use more efficient and less fuel-consuming reforming techniques.

Among the advantages of the invention, it should also be observed that a single compression step which compresses the PSA offgas from a pressure of about 1.3 bar to a total pressure of about 40 to 80 bar suffices for the overall purification/cryogenic separation method. This serves in fact to compress the PSA offgas to a pressure at least equal to that of step (a), and such that the $CO_2$ partial pressure is higher than 15 bar. In consequence, this pressure permits both the recycling to syngas generation and cryogenic separation of the carbon dioxide.

Alternatives of the inventive method can be used to treat various types of gas stream having a sufficient carbon dioxide content, typically about 15% or more on dry basis (mention can be made in particular of offgases, flue gases), whether at high or low pressure, dry or wet. The compression steps (up to a $CO_2$ partial pressure of between 15 and 40 bar), of drying and condensation/separation must be adapted in this case to the gas to be treated.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for the combined production of hydrogen and carbon dioxide from a mixture of hydrocarbons, comprising at least:

(a) generating a syngas containing at least carbon dioxide, hydrogen, carbon monoxide, methane, and water vapor, from said hydrocarbon mixture;
(b) cooling the syngas issuing from (a) with recovery of the available waste heat;
(c) back-converting, to steam, all or part of the cooled syngas issuing from (b) in order to oxidize most of the carbon monoxide it contains to carbon dioxide, with the corresponding production of hydrogen;
(d) cooling the mixture issuing from step (c), with condensation of the steam, by heat exchange with various boiler feedwater and/or deionized water circuits;
(e) purifying the cooled mixture issuing from (d) in a pressure swing adsorption (PSA) unit to obtain a hydrogen-enriched stream having a purity at least equal to 98% and an offgas called "PSA offgas" containing carbon dioxide, at a pressure of about 1 to 3 bar abs;

and steps of treating said PSA offgas to obtain a carbon dioxide-enriched fluid, comprising at least:

(f) compressing the PSA offgas to a pressure higher than the reforming pressure and such that the partial pressure of the $CO_2$ therein is between about 15 and 40 bar;
(g) drying the compressed PSA offgas by removing the water therein to obtain a dry gas; and
(h) two or more successive steps (hn) of condensation/separation, such that
each of the steps (hn) itself comprises:
a step of condensing all or part of the $CO_2$ present in the gas issuing from the preceding step, followed by
a step of separating the $CO_2$-rich condensate issuing from the separation from the gas phase containing incondensable compounds and constitutes an incondensables purge;
the step(s) (hn) are implemented at temperatures tn of between ambient temperature and −56° C., with, for any n tn lower than tn-1;
the gas phase issuing from step (hn-1) feeds the step (hn), the gas phase issuing from the final step (hn) constituting the incondensables purge; and
using the incondensables purge.

2. The method of claim 1, wherein step (a) is a step of catalytic or noncatalytic partial oxidation or a steam or autothermal reforming step.

3. The method of claim 1, wherein all or part of the condensates issuing from the steps (hn) are vaporized after expansion, with recovering refrigeration, in order to produce $CO_2$ gas under a pressure of between 5 and 40 bar.

4. The method of claim 3, wherein the $CO_2$ produced is then compressed to be transported by gas pipeline to a use and/or sequestration site.

5. The method of claim 1, wherein all or part of the condensates issuing from the steps (hn) are produced in liquid form to be transported in this form to a use and/or sequestration site.

6. The method of claim 1, for obtaining food grade carbon dioxide, wherein it further comprises at least:
   a step of removing heavy impurities prior to the first step (hn); and
   for at least part of the steps (hn), a step (i) of removing the light impurities present in the corresponding condensates to obtain food grade $CO_2$, this step comprising at least:
      a step (i1) of expanding the condensate to a pressure of about 5 to 40 bar; and
      a step (i2) of distilling the expanded condensate to obtain a liquid phase consisting of purified food grade $CO_2$, and a gas phase containing said light impurities.

7. The method of claim 6, wherein all or part of the gas phase issuing from step (i2) is reincorporated in the compression step (f).

8. The method of claim 7, wherein said reincorporation is carried out via an ejector in order to further contribute to the compression of step (f).

9. The method of claim 1, wherein the last of the steps (hn) comprises at least the following intermediate steps:
   a step of condensing, at a temperature lower than $-40°$ C., all or part of the $CO_2$ present in the gas phase issuing from step (hn-1);
   a step of separating the $CO_2$-rich condensate obtained from the gas phase which contains the incondensable compounds and constitutes the incondensables purge;
   a step of heating the incondensables purge and the condensate expanded to a pressure of between 5 and 35 bar countercurrently with the condensation, and recovering refrigeration in order to cool the process fluids; and
   a step of reincorporating the vaporized $CO_2$-rich phase in the compression step (f).

10. The method of claim 1, wherein all or part of the incondensables purge is used, without supplementary treatment, outside the method.

11. The method of claim 1, wherein all or part of the purge is expanded to produce refrigeration prior to a use outside the method.

12. The method of claim 1, wherein all or part of the incondensables purge is reincorporated, without supplementary treatment, in the method.

13. The method of claim 12, wherein all or part of the incondensables purge is reincorporated in the syngas generation step to be used as fuel.

14. The method of claim 12, wherein the incondensables purge, being of a sufficient pressure, is reincorporated, in full or in part, without supplementary treatment, in the syngas generation step, to be used as fuel and/or as feed gas.

15. The method of claim 1, wherein the incondensables purge is treated in a permeation unit to produce a purge waste rich in methane and carbon monoxide, available at a pressure higher than the pressure of step (a), and a permeate enriched with hydrogen and optionally with carbon dioxide, at a pressure higher than the operating pressure of the PSA unit of step (e).

16. The method of claim 15, wherein all or part of said permeate is recycled to the inlet of the PSA purification unit of step (e).

17. The method of claim 16, wherein the permeate recycled to the PSA purification unit is separated into two fractions, and in that one of the fractions is used for the regeneration of the dryers in step (g), the fractions are then combined, and the entire recycled permeate is sent to the inlet of the PSA purification unit of step (e).

18. The method of claim 15, wherein the purge waste is recycled to step (a), as partial substitution for the hydrocarbon mixture, and/or is used as fuel, either in the combustion chamber of a nonadiabatic reformer, or in a feed preheating furnace in the case of autothermal reforming or a partial oxidation.

19. The method of claim 15, wherein it further comprises a step of incorporating, in step (f), a gas phase poorer in $CO_2$ than the PSA offgas, issuing from a buffer tank supplied in full or in part with the permeate sent to the PSA unit.

20. The method of claim 1, wherein it comprises a step of incorporating, in step (f), a gas phase richer in $CO_2$ than the PSA offgas, issuing from a buffer tank supplied in full or in part with the condensed—and then vaporized—phase issuing from the separation of the last of the steps (hn).

21. A method for the combined production of hydrogen and carbon dioxide from a mixture of hydrocarbons, comprising at least:
   a step (a) of generating a syngas containing at least carbon dioxide, hydrogen, carbon monoxide, methane and water vapor, from said hydrocarbon mixture;
   a step (b) of cooling the syngas issuing from (a) with recovery of the available waste heat;
   a step (c) of back-converting to steam all or part of the cooled syngas issuing from (b) to oxidize most of the carbon monoxide it contains to carbon dioxide, with the corresponding production of hydrogen;
   a step (d) of cooling the mixture issuing from step (c), with condensation of the steam, by heat exchange with various boiler feedwater and/or deionized water circuits;
   a step (g') of drying the cooled mixture issuing from (d) by removing the water therein to obtain a dry gas mixture;
   a step (e') of purifying the dry mixture issuing from (g') in a pressure swing adsorption (PSA) unit to obtain a hydrogen-enriched stream having a purity at least equal to 98% and an offgas called "dry PSA offgas" containing carbon dioxide, at a pressure of about 1 to 3 bar abs;
and steps of treating said dry PSA offgas to obtain a carbon dioxide-enriched fluid, comprising at least:
   a step (f') of compressing the dry PSA offgas to a pressure higher than the reforming pressure and such that the partial pressure of the $CO_2$ therein is between about 15 and 40 bar;
   two or more successive steps (hn) of condensation/separation, such that
      each of the steps (hn) itself comprises:
         a step of condensating all or part of the $CO_2$ present in the gas issuing from the preceding step, followed by
         a step of separating the $CO_2$-rich condensate issuing from the separation from the gas phase containing incondensable compounds,
      and,
         the step(s) (hn) are implemented at temperatures tn of between ambient temperature and $-56°$ C., with, for any n tn lower than tn-1;
         the gas phase issuing from step (hn-1) feeds the step (hn), the gas phase issuing from the final step (hn) constituting an incondensables purge; and
         a step of using the incondensables purge.

* * * * *